US006714735B1

(12) United States Patent
Lin et al.

(10) Patent No.: US 6,714,735 B1
(45) Date of Patent: Mar. 30, 2004

(54) CAPACITOR CHARGING DEVICE FOR A FLASH

(75) Inventors: Wen-Hwa Lin, Taipei (TW); Chien-Kuo Hsu, Taipei (TW)

(73) Assignee: Premier Image Technology Corporation, Taipei (TW)

( * ) Notice: Subject to any disclaimer, the term of this patent is extended or adjusted under 35 U.S.C. 154(b) by 0 days.

(21) Appl. No.: 10/456,582

(22) Filed: Jun. 9, 2003

(51) Int. Cl.[7] .......................... G03B 15/05; H05B 41/26

(52) U.S. Cl. .................... 396/206; 348/371; 315/241 P

(58) Field of Search ................................ 396/205, 206; 348/370, 371; 315/241 P

(56) References Cited

U.S. PATENT DOCUMENTS 5,250,978 A * 10/1993 Ogawa ....................... 396/206

* cited by examiner

*Primary Examiner*—W. B. Perkey
(74) *Attorney, Agent, or Firm*—Browdy and Neimark

(57) ABSTRACT

A capacitor charging device for a flash, finishes charging the flash capacitor in a gradual manner. It has a flash capacitor, a voltage transforming circuit, a voltage mode pulse width modulation (PWM) control circuit and a charging control circuit. The charging control circuit has a time control capacitor to make the pulse width of the pulse voltage output from the voltage mode PWM control circuit increase gradually. The voltage transforming circuit is driven to provide a gradually increasing induced current to the flash capacitor to reduce the damage of the external circuit, flash capacitor and rechargeable battery.

8 Claims, 5 Drawing Sheets

CAPACITOR CHARGING DEVICE FOR A FLASH

FIELD OF THE INVENTION

The present invention is directed to a capacitor charging device for a flash, and more particularly, to a capacitor charging device that finishes charging the flash capacitor in a gradual manner.

BACKGROUND OF THE INVENTION

In accordance with prior art, a capacitor charging device for a flash is usually disposed in a digital camera. It is used to charge the flash capacitor of the digital camera so as to provide electricity to the flash. As shown in FIG. 1, the charging device includes a flash capacitor 10, voltage transforming circuit 20, current mode pulse width modulation (PWM) control circuit 30 and charging control circuit 40. The voltage transforming circuit 20 further includes a transformer T10, diode D10, resistor R100 and metal-oxide-semiconductor field-effect transistor (MOSFET) Q10.

When the charging device functions initially, the current mode PWM control circuit 30 outputs a pulse current I to control the gate-to-source voltage $V_{GS}$. The charging control circuit 40 controls the pulse width of the current I with a time control capacitor (not shown). Since the capacitance of the time control capacitor is small, the soft start period (i.e. the period for reaching the maximum pulse width of the current I) of the current mode PWM control circuit 30 is very short. Hence, the current mode PWM control circuit 30 can output a pulse current I with maximum pulse width in a very short time.

When the pulse current I is "on" (i.e. a state with an output current), the gate-to-source voltage VGS of the MOSFET Q10 is positive and results in an increase of the current $I_D$ passing through the MOSFET Q10. While the current ID increases, the transformer T10 generates an induced current $I_0$ to charge the flash capacitor 10. When the pulse current I is "off" (i.e. a state with no output current), the gate-to-source voltage $V_{GS}$ of the MOSFET Q10 is zero and results in the decrease of the current $I_D$. While the current $I_D$ decreases, due to the tremendous reverse resistance of the diode D10, the induced current $I_0$ also reduces to zero. Thereby, the flash capacitor 10 can be charged by the induced current $I_D$ in the on-off circle of the pulse current I.

However, since the soft start period of the conventional charging device is very short, the induced current $I_D$ reaches its maximum value in a very short time. Hence, the conventional charging device easily damages the external circuit, flash capacitor 10 and the rechargeable battery of the digital camera so that the life of the digital camera is decreased. Further, the conventional current mode PWM control circuit 30 is expensive (comparing with the voltage mode PWM control circuit) and makes the digital cameral costly.

Accordingly, as discussed above, the conventional charging device has some drawbacks that could be improved. The present invention aims to resolve the drawbacks in the prior art.

SUMMARY OF THE INVENTION

An objective of the present invention is to provide a capacitor charging device for a flash that can charge the flash capacitor completely within the soft start period so as to prevent the induced current from increasing abruptly.

Thereby, the prevent invention can reduce the damage of the external circuit, flash capacitor and rechargeable battery and increase the life of the digital camera.

Another objective of the present invention is to provide a capacitor charging device for a flash that uses a voltage mode PWM control circuit to replace the current mode PWM control circuit to reduce the cost of the digital camera.

Still another objective of the present invention is to provide a capacitor charging device for a flash that gradually increases the pulse width of the pulse voltage output from the voltage mode PWM control circuit to prevent instantaneously large current. Still another objective of the present invention is to provide a capacitor charging device for a flash that use a time control capacitor ranging from 3.3 uF to 22 uF to control the length of the soft start period.

For reaching the objective above, the present invention provides a capacitor charging device for a flash that includes a flash capacitor, voltage transforming circuit, voltage mode PWM control circuit and charging control circuit. The charging control circuit has a time control capacitor ranging from 3.3 uF to 22 uF to control the voltage mode PWM control circuit to increase the pulse width of the pulse voltage gradually within the soft start period. Then, by using the pulse voltage, the voltage mode PWM control circuit can drive the voltage transforming circuit to provide an induced current that increases gradually to charge the flash capacitor. In this manner, the present invention can reduce the damage of the external circuit, flash capacitor and rechargeable battery, and charge the flash capacitor completely within the soft start period.

Numerous additional features, benefits and details of the present invention are described in the detailed description, which follows.

BRIEF DESCRIPTION OF THE DRAWINGS

The various objects and advantages of the present invention will be more readily understood from the following detailed description when read in conjunction with the appended drawing, in which.

DETAILED DESCRIPTION

Figure 1:
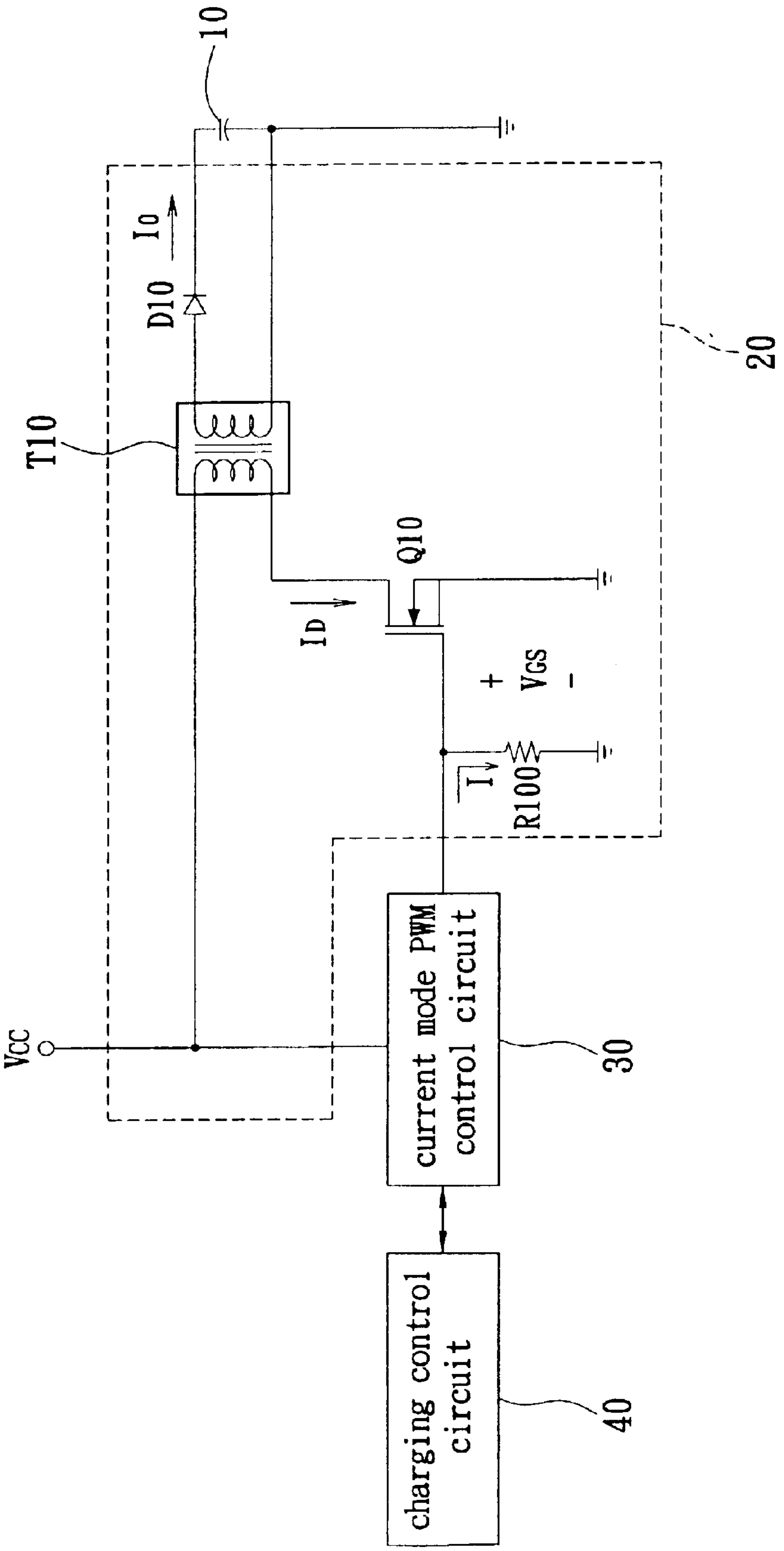
FIG. 1 PRIOR ART
FIG. 1 is a circuit diagram of a conventional capacitor charging device for a flash.
Figure 2:
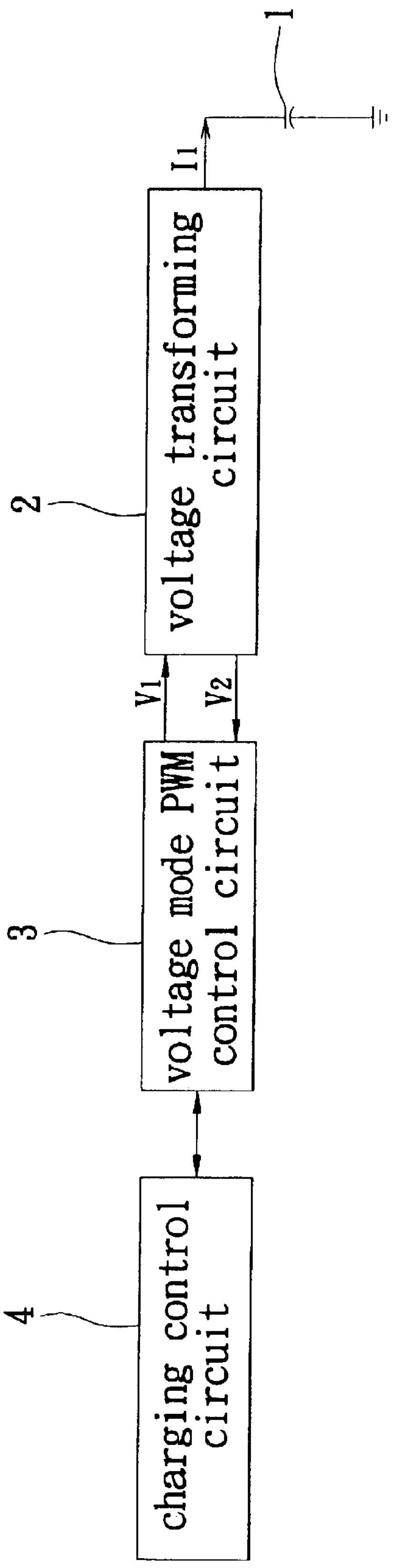
FIG. 2 is a block diagram of a capacitor charging device for a flash according to the present invention.

Reference is made to FIG. 2, which is a block diagram of a capacitor charging device for a flash according to the present invention. The charging device includes a flash capacitor 1, voltage transforming circuit 2, voltage mode PWM control circuit 3 and charging control circuit 4.

When the voltage across the flash capacitor 1 is low, the charging control circuit 4 provides a low voltage to activate the voltage mode PWM control circuit 3 and make it output a pulse voltage $V_1$. Then, the voltage mode PWM control circuit 3 provides a constant current to charge a time control capacitor (not shown) of the charging control circuit 4. At the same time, the voltage mode PWM control circuit 3 gradually increases the pulse width of the pulse voltage $V_1$ according to the voltage across the time control capacitor.

The pulse voltage $V_1$ drives the voltage transforming circuit 2 to provide an induced current $I_1$ to charge the flash capacitor 1. When the flash capacitor 1 is charged completely, the voltage transforming circuit 2 provides a high voltage $V_2$ to stop the voltage mode PWM control circuit 3 outputting the pulse voltage $V_1$.

Figure 3A:
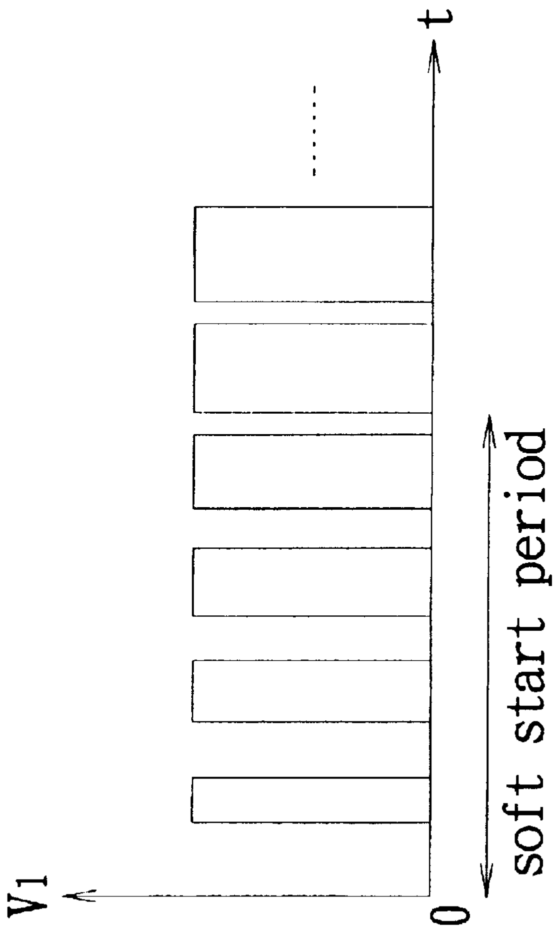
FIG. 3A is a time diagram of the pulse voltage $V_1$ according to the present invention.
Figure 3B:
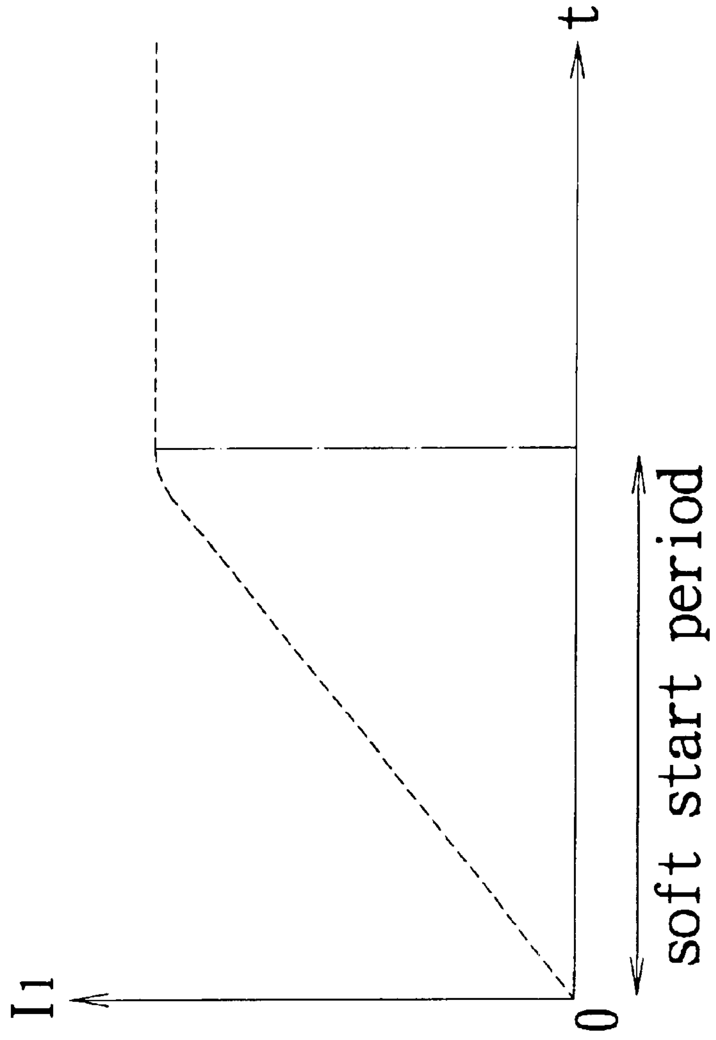
FIG. 3B is a time diagram of the induced current $I_1$ according to the present invention.

Reference is made to FIG. 3A, which is a time diagram of the pulse voltage $V_1$. In the soft start period, the pulse width of the pulse voltage $V_1$ increases gradually according to the voltage across the time control capacitor. Reference is made to FIG. 3B, which is a time diagram of the induced current $I_1$. In the soft start period, the induced current $I_1$ increases gradually with the pulse width of the pulse voltage $V_1$.

Furthermore, the time control capacitor of the charging control circuit 4 relates to the length of the soft start period. If the capacitance of the time control capacitor is increased, the time control capacitor will need more charging time and the length of the soft start period will also increase. On the contrary, the soft start period will decrease if the capacitance of the time control capacitor is decreased. In accordance with the present invention, the time control capacitor should be large enough so that the flash capacitor 1 can be charged completely within the soft start period. In practice, the capacitance of the time control capacitor can be 3.3 uF–22 uF.

Figure 4:
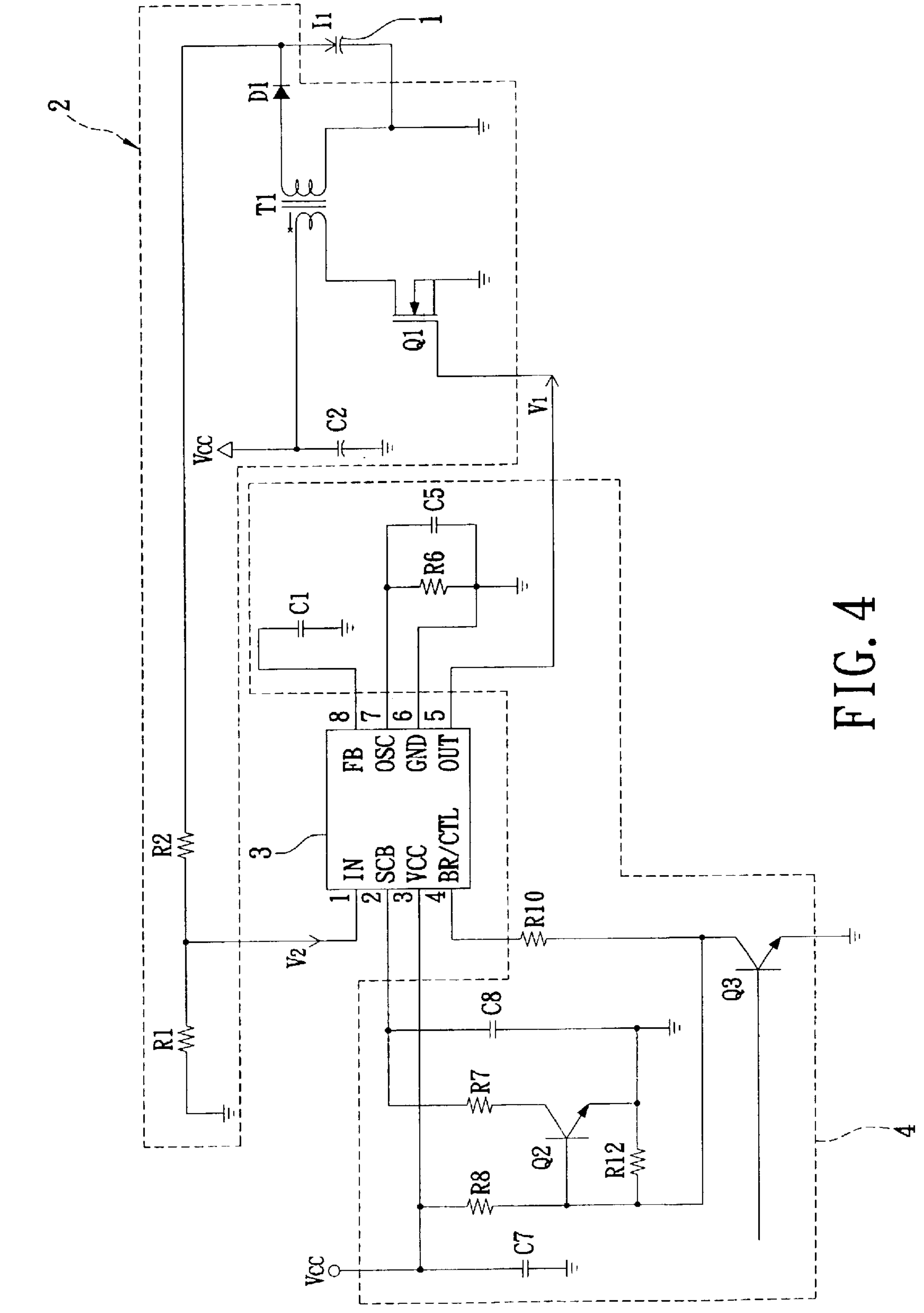
FIG. 4 is circuit diagram of the present invention.

Reference is made to FIG. 4, which is a circuit diagram of the present invention. The voltage transforming circuit 2 includes a diode D1, transformer T1, resistors R1 and R2, capacitor C2 and MOSFET Q1. The charging control circuit 4 includes capacitors C1, C5 and C7, resistors R6–8, R10 and R12, transistors Q2 and Q3 and a time control capacitor C8.

When the voltage across the flash capacitor 1 is low, the external circuit 3 (not shown) provides a high voltage to the transistor Q3 of the charging control circuit 4. At this time, the transistor Q3 is "on" and the voltage of the pin BR/CTL of the voltage mode PWM control circuit 3 is low. Thereby, the voltage mode PWM control circuit 3 is activated to output the pulse voltage $V_1$.

Then, the voltage mode PWM control circuit 3 outputs a constant current to charge the time control capacitor C8 of the charging control circuit 4. At the same time, the voltage mode PWM control circuit 3 gradually increases the pulse width of the pulse voltage $V_1$ according to the voltage across the time control capacitor C8.

The pulse voltage $V_1$ drives the MOSFET Q1 of the voltage transforming circuit 2 to make the current passing through the MOSFET Q1 change with the pulse voltage $V_1$. Hence, via the transformer T1, the voltage transforming circuit 2 provides an induced current $I_1$ to charge the flash capacitor 1.

When the flash capacitor 1 is charged completely, the voltage across the flash capacitor 1 is high so as to provide a high voltage $V_2$ to the pin IN of the voltage mode PWM control circuit 3 via the resistors R1 and R2. Then, the voltage mode PWM control circuit 3 stops outputting the pulse voltage $V_1$.

In conclusion, the charging device according to the present invention can improve the drawbacks of the conventional charging device indeed. It can charge the flash capacitor completely within the soft start period so as to reduce the damage of the external circuit, flash capacitor and rechargeable battery. Further, the charging device of the present invention employs the low-price voltage mode PWM control circuit to lower the cost of the digital camera.

Although the present invention has been described with reference to the preferred embodiment thereof, it will be understood that the invention is not limited to the details thereof. Various substitutions and modifications have been suggested in the foregoing description, and other will occur to those of ordinary skill in the art: Therefore, all such substitutions and modifications are embraced within the scope of the invention as defined in the appended claims.

What is claimed is:

1. A charging device, comprising:

a flash capacitor;

a voltage transforming circuit, electrically connected to the flash capacitor and providing an induced current to charge the flash capacitor; and a voltage mode pulse width modulation (PWM) control circuit, electrically connected to the voltage transforming circuit and providing a pulse voltage to drive the voltage transforming circuit to provide the induced current;

wherein the voltage mode PWM control circuit increases a pulse width of the pulse voltage in a gradual way to prevent the induced current from increasing abruptly.

2. The charging device as claimed in claim 1, further comprising:

a charging control circuit, electrically connected to the voltage mode PWM control circuit to control the pulse width of the pulse voltage;

wherein the charging control circuit has a time control capacitor and the pulse width of the pulse voltage increases when the voltage across the time control capacitor increases.

3. The charging device as claimed in claim 2, wherein the time control capacitor has a predetermined capacitance to allow the flash capacitor to be charged completely within a soft start period.

4. The charging device as claimed in claim 3, wherein the capacitance of the time control capacitor is about 3.3 uF–22 uF.

5. The charging device as claimed in claim 1, wherein the voltage transforming circuit provides a high voltage to make the voltage mode PWM control circuit stop outputting the pulse voltage when the flash capacitor is charged completely.

6. A capacitor charging device, comprising:

a flash capacitor;

a voltage transforming circuit, electrically connected to the flash capacitor and providing an induced current to charge the flash capacitor;

a voltage mode PWM control circuit, electrically connected to the voltage transforming circuit and providing a pulse voltage to drive the voltage transforming circuit to provide the induced current; and a charging control circuit, electrically connected to the voltage mode PWM control circuit to control a pulse width of the pulse voltage;

wherein the charging control circuit has a time control capacitor and the pulse width of the pulse voltage increases when the voltage across the time control capacitor increases, the time control capacitor having a predetermined capacitance to make the flash capacitor be charged completely within a soft start period.

7. The charging device as claimed in claim 6, wherein the capacitance of the time control capacitor is about 3.3 uF–22 uF.

8. The charging device as claimed in claim 6, wherein the voltage transforming circuit provides a high voltage to make the voltage mode PWM control circuit stop outputting the pulse voltage when the flash capacitor is charged completely.

* * * * *